(12) United States Patent
Campbell et al.

(10) Patent No.: US 11,091,104 B2
(45) Date of Patent: Aug. 17, 2021

(54) BODY MOLDING AND METHOD OF APPLYING AN ACCENT STRIP TO A BODY MOLDING

(71) Applicant: Tiercon Corp, Toronto (CA)

(72) Inventors: Christopher Campbell, Vineland (CA); Mihai Cioranic, Cambridge (CA); Jeff Rafael, Hamilton (CA)

(73) Assignee: Tiercon Corp, Toronto (CA)

( * ) Notice: Subject to any disclaimer, the term of this patent is extended or adjusted under 35 U.S.C. 154(b) by 285 days.

(21) Appl. No.: 16/319,926

(22) PCT Filed: Jul. 28, 2017

(86) PCT No.: PCT/CA2017/050909
§ 371 (c)(1),
(2) Date: Jan. 23, 2019

(87) PCT Pub. No.: WO2018/018157
PCT Pub. Date: Feb. 1, 2018

(65) Prior Publication Data
US 2019/0263333 A1 Aug. 29, 2019

Related U.S. Application Data

(60) Provisional application No. 62/367,662, filed on Jul. 28, 2016.

(51) Int. Cl.
*B60R 13/04* (2006.01)
*B62D 65/16* (2006.01)

(52) U.S. Cl.
CPC .............. *B60R 13/04* (2013.01); *B62D 65/16* (2013.01)

(58) Field of Classification Search
CPC ....... B60R 13/02; B60R 13/04; B60R 13/043; B62D 65/02; B62D 65/16
(Continued)

(56) References Cited

U.S. PATENT DOCUMENTS 3,441,305 A * 4/1969 Trammell, Jr. ......... B60R 13/04
293/128
3,745,056 A * 7/1973 Jackson .................. B60R 13/04
428/157

(Continued)

FOREIGN PATENT DOCUMENTS

| DE | 3502056 A1 * | 7/1986 | ............. B60R 13/02 |
| EP | 0468873 A1 * | 1/1992 | ............. B60R 13/04 |
| JP | 58133940 A * | 8/1983 | ............. B60R 13/04 |

*Primary Examiner* — Hilary L Gutman
(74) *Attorney, Agent, or Firm* — Miller Canfield

(57) ABSTRACT

An elongate base structure for receiving an accent strip for a vehicle molding. The elongate base structure has top and bottom grooves defined in an outward facing surface, and a middle base portion with at least one adhesive region for receiving an adhesive, such as adhesive tape. At least one slot is defined in one of the top or bottom grooves adjacent to and extending along the at least one adhesive region in order to allow the liner of the adhesive tape to be removed through the slot after the accent strip has been positioned in the base structure. An aperture is defined in the middle base portion, between the top and bottom grooves, for use by an assembler to support and position the accent strip in the base structure. The base structure may define an opening at each end to receive and conceal the ends of the accent strip.

17 Claims, 6 Drawing Sheets

(58) Field of Classification Search
USPC ........................................................ 296/1.08
See application file for complete search history.

(56) References Cited

U.S. PATENT DOCUMENTS

| | | | | |
|---|---|---|---|---|
| 3,777,438 A | * | 12/1973 | Brown | E04F 19/026 52/718.04 |
| 3,881,042 A | * | 4/1975 | Ungerer | B60R 13/04 428/67 |
| 3,959,537 A | * | 5/1976 | Loew | B60R 13/02 428/31 |
| 3,982,780 A | * | 9/1976 | Keith | B60R 13/04 293/128 |
| 4,296,155 A | * | 10/1981 | Madonia | B32B 15/08 428/31 |
| 4,446,179 A | * | 5/1984 | Waugh | B32B 3/20 293/128 |
| 5,188,408 A | * | 2/1993 | Berdan | B60R 13/04 293/128 |
| 5,662,758 A | | 9/1997 | Hamilton et al. | |
| 5,783,020 A | * | 7/1998 | Kress | B60R 13/04 156/291 |
| 6,318,045 B1 | * | 11/2001 | Kress | B60R 13/04 156/71 |
| 6,399,168 B1 | * | 6/2002 | Sato | B29C 45/14811 428/200 |
| 7,517,001 B1 | * | 4/2009 | Goldbaum | B60R 13/04 296/126 |
| 2005/0181173 A1 | * | 8/2005 | Hermann | B60R 13/04 428/119 |
| 2007/0085361 A1 | * | 4/2007 | Hauser | B60R 13/04 296/1.08 |
| 2007/0281133 A1 | | 12/2007 | Smith et al. | |
| 2012/0032592 A1 | * | 2/2012 | Breunig | B60Q 3/64 315/77 |
| 2018/0154844 A1 | * | 6/2018 | Katayama | B60J 10/86 |
| 2018/0281506 A1 | * | 10/2018 | Egashira | B32B 27/302 |

* cited by examiner

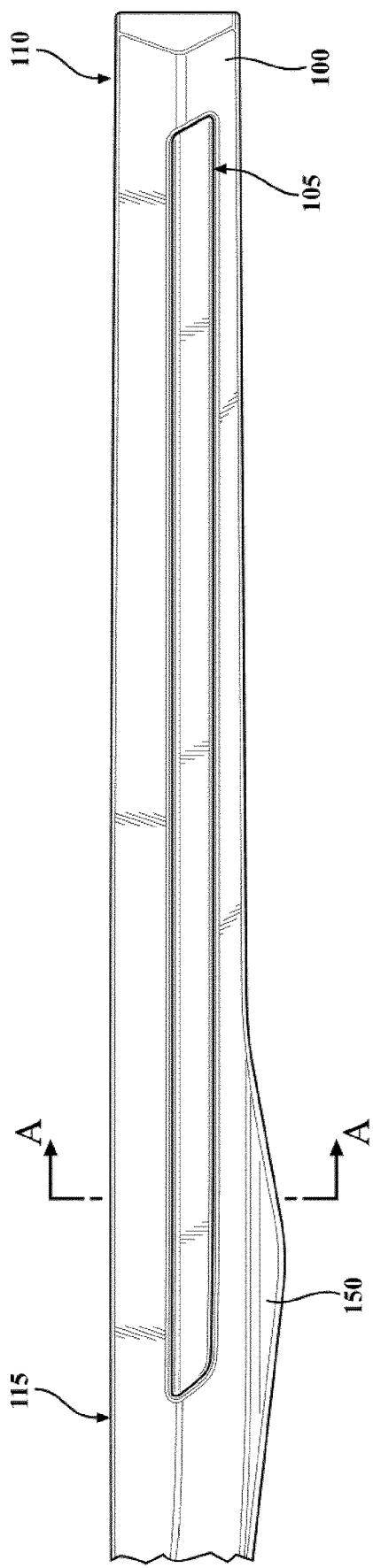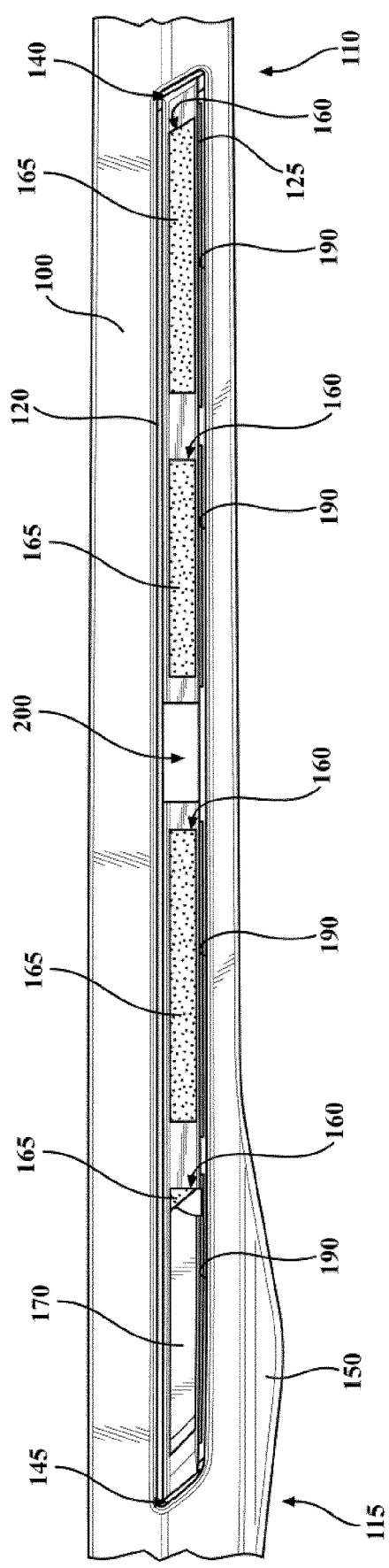

BODY MOLDING AND METHOD OF APPLYING AN ACCENT STRIP TO A BODY MOLDING

CROSS-REFERENCE TO RELATED APPLICATIONS

This application claims priority to U.S. Provisional Application No. 62/367,662 filed on Jul. 28, 2016, which is herein incorporated by reference.

BACKGROUND OF THE INVENTION

1. Field of the Invention

This invention relates to a molding for a vehicle and a method of attaching an accent strip to a molding for a vehicle.

2. Description of Related Art

Automotive vehicles often include one or more moldings for aesthetic purposes or to prevent dents or scratches to the vehicle. The molding and any accent pieces which are part of the molding need to be mounted precisely to avoid misalignments and visible gaps which detract from the decorative aspects of these pieces. Damage, such as scratches to the vehicle or molding, also needs to be avoided. Accent strips may be attached to the vehicle molding using adhesive or mechanical attachment mechanisms.

SUMMARY OF THE INVENTION

The present invention provides a body molding and accent strip, and a method for mounting an accent strip to the body molding, which are particularly suited for mounting a metal accent strip to a plastic molding structure.

In one embodiment there is provided an elongate base structure for receiving an accent strip for a vehicle molding, the elongate base structure includes an outward facing surface; top and bottom elongate grooves defined in the outward facing surface; a middle base portion between the top and bottom grooves, the middle base portion having an outward facing surface with at least one adhesive region for receiving an adhesive; at least one slot defined in one of the top groove or the bottom groove, the at least one slot being adjacent to and extending along the at least one adhesive region of the middle base portion; and an aperture defined by middle base portion, between the top and bottom grooves. In some embodiments, the elongate base structure further includes a first end; a second end; a first opening defined by the base structure, the first opening terminating the top and bottom grooves adjacent the first end; and a second opening defined by the base structure, the second opening terminating the top and bottom grooves adjacent the second end.

In another embodiment there is provided a method of mounting an accent strip for a vehicle to the elongate base structure described above, with the middle base portion the base structure having adhesive tape with a removable liner applied to the at least one adhesive region. The method includes removing a leading portion of the removable liner of the adhesive tape; threading the leading portion of the removable liner through the slot; placing the accent strip within the grooves of the elongate base structure; aligning the accent strip within the elongate base structure using the aperture; removing a remaining portion of the removable liner using the leading portion; and pressing the accent strip against the middle base portion to secure the accent strip to the elongate base structure. In some embodiments, placing the accent strip within the grooves of the elongate base structure includes inserting a first end of the accent strip into the first opening of the base; and rotating and sliding the accent strip to insert a second end of the accent strip into the second opening.

BRIEF DESCRIPTION OF THE DRAWINGS

Advantages of the present disclosure will be readily appreciated as the same becomes better understood by reference to the following detailed description when considered in connection with the accompanying drawings wherein:

FIG. 1 is a front view of an accent strip and a portion of a base structure of a vehicle according to an embodiment of the invention.

FIG. 2 is a front view of FIG. 1, showing only the portion of the base structure.

DETAILED DESCRIPTION

Figure 3:
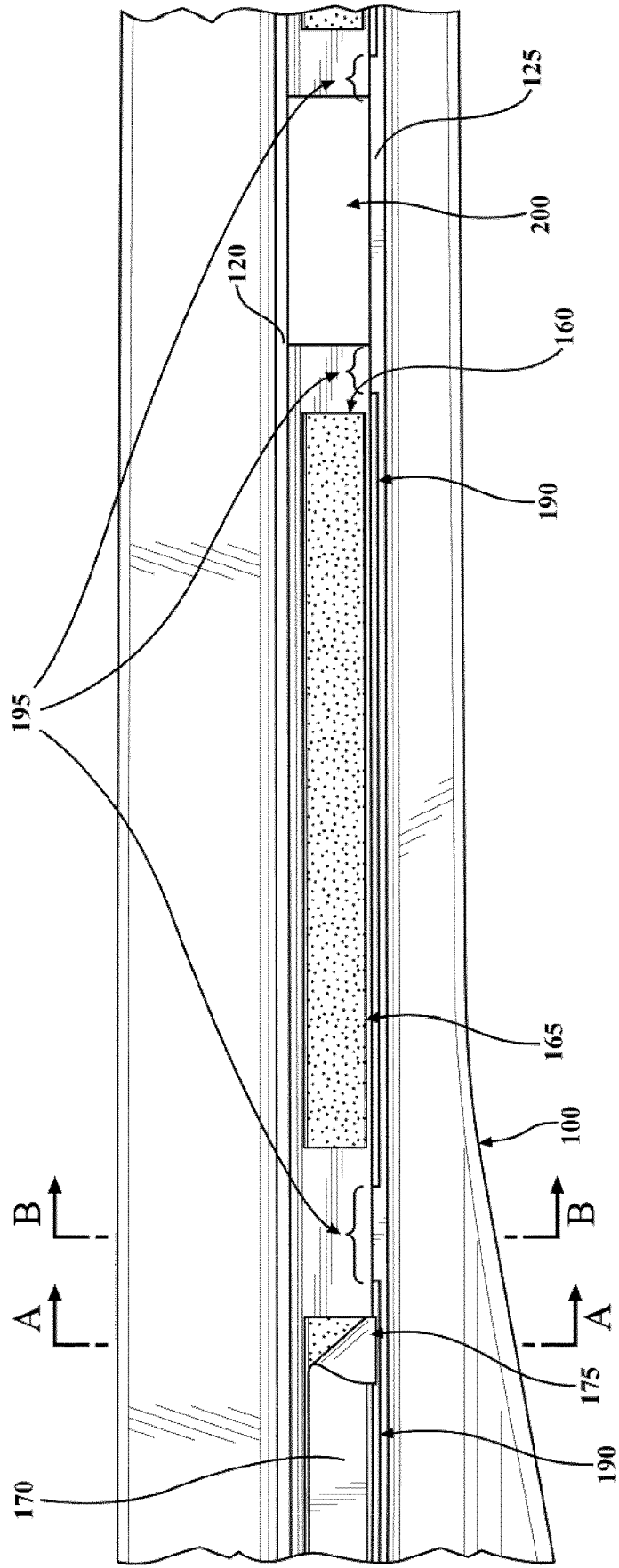
FIG. 3 is enlarged view of FIG. 2.

Referring to the Figures, wherein like numerals indicate like or corresponding parts throughout the several views, a base structure 100 according to an embodiment of the invention is shown. Directional references employed in the specification or claims, such as top, bottom, upper, lower, front, rear, first, second, right, left and the like, are employed for ease of description and are not intended to limit the scope of the invention. It will be appreciated that the structures and methods described herein may be used in various orientations.

Described herein is a base structure for a vehicle molding which supports a rigid accent strip, such as a metal or metal plated accent strip, with the use of an adhesive tape. Specifically, a base structure 100 for a vehicle molding and an accent strip 105 are illustrated in FIG. 1. The base structure 100 is typically made of plastic and may be a molding which is attached to a vehicle (not shown) for decorative or other purposes. In some embodiments, the base structure 100 is part of the vehicle. The accent strip 105 may be made of metal or chrome plated plastic. In some embodiments, the accent strip 105 may be made of other materials, such as a rigid plastic. Due in part to its rigidity, the accent strip 105 cannot be mounted to a traditional base structure (not shown) by traditional means. The base structure 100 described herein also conceals designed thermal gaps, unwanted misalignments between the accent strip 105 and the base structure 100, and sharp ends or edges of the accent strip 105.

The base structure 100 is an elongate structure having a first end 110 and a second end 115. As illustrated in FIGS. 2 to 6, the base structure 100 defines two grooves, a top elongate groove 120 and a bottom elongate groove 125 in an outward facing surface 130 between the first and second ends 110, 115. A middle portion 135 of the base structure 100 extends from the top groove 120 to the bottom groove 125. The top and bottom grooves 120, 125 receive and conceal portions of the accent strip 105 which is mounted to and supported by the middle portion 135, as described in further detail below.

In some embodiments, the base structure 100 defines a first opening 140 in the first end 110 of the base structure 100 and a second opening 145 in the second end 115. In some embodiments, the openings 140, 145 are defined near the ends of the top and bottom grooves 120, 125. In other embodiments, as illustrated in FIG. 2, the first opening 140 terminates the top and bottom grooves 120, 125 adjacent the first end 110 of the base structure, and the second opening 145 terminates the top and bottom grooves 120, 125 adjacent the second end 115 of the base structure. The first and second openings 140, 145 may receive and conceal first and second ends of the accent strip 105, as described in further detail below. For reference herein, the remaining portion of the base structure 100 beyond or outside of the top and bottom grooves 120, 125, and first and second openings 140, 145, is referred to as the outer portion 150 of the base structure 100. The base structure 100 and the outer portion 150 may be generally any size and shape desired for the vehicle molding.

Figure 4:
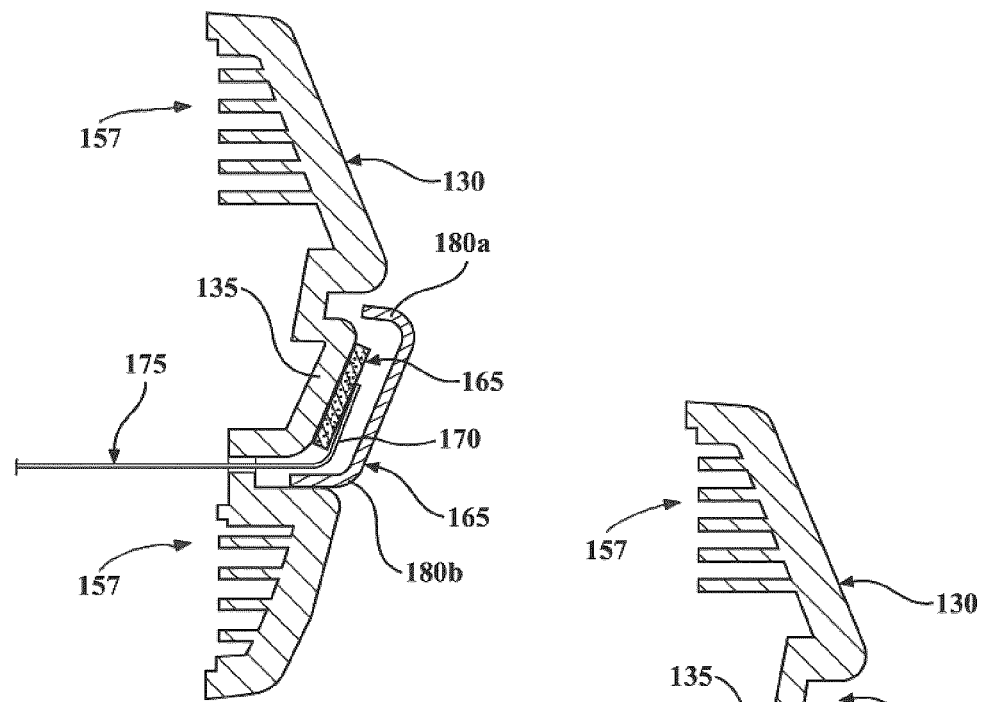
FIG. 4 is a cross-sectional view of FIG. 1 taken along line A-A.
Figure 5:
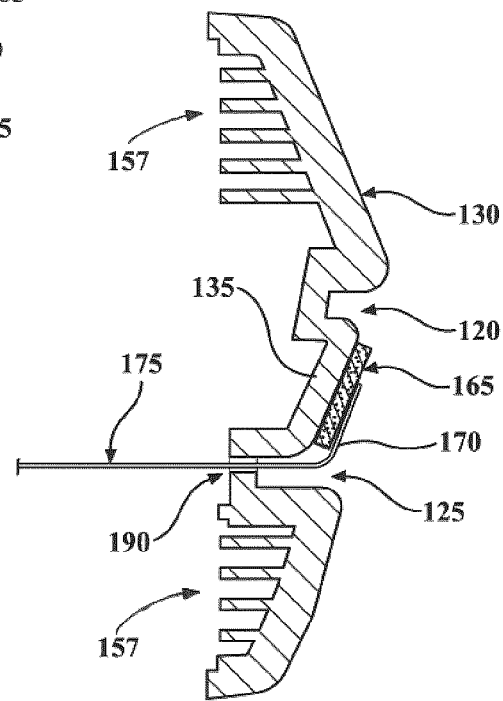
FIG. 5 is a cross-sectional view of FIG. 3 taken along line A-A.

The middle portion 135 of the base structure 100 has an outward facing surface 155. In some embodiments, as can be seen in FIGS. 4 and 5, the middle portion 135 and outward facing surface 155 are recessed and sit below the outward facing surface 130 of the outer portion 150 of the base structure 100. As a result, once the accent strip 105 is mounted to the base structure 100, the accent strip 105 may be flush with or recessed slightly below the outward facing surface 130. Thus, the accent strip 105 may be protected by the base structure 100. In some embodiments, the outer portion 150, or the middle portion 135, or both the outer portion 150 and the middle portion 135 of the base structure 100 may be angled to provide the desired outward appearance and shape for the vehicle molding. In some embodiments, the base structure 100 may include one or more bosses, ribs, flanges, or combinations thereof, to ensure that the accent strip 105 is offset from the vehicle surface (not shown). An example of ribs 157 extending from the inward facing surface or inner side of the base structure 100 can been seen in FIGS. 4, 5 and 5A. The spacing created by the ribs 157 ensures that any sharp ends or edges of the accent strip 105 do not scratch of damage the surface of the vehicle to which the body structure 100 is mounted. It will be appreciated that the outward facing surface 130 of the base structure 100, and the outward facing surface 155 of the middle portion 135, refer to the side of the base structure 100 displaying the accent strip 105.

The middle portion 135 includes one or more areas or regions on the outward facing surface 155, referred to herein as adhesive regions 160, to which an adhesive may be applied for fastening the accent strip 105 to the base structure 100. The adhesive may comprise an adhesive foam tape 165 having a removable liner 170. For illustration purposes, multiple sections of adhesive tape 165 are shown in FIG. 2 with the removable liner 170 removed from all sections except the section of adhesive tape 165 adjacent the second end 115 of the base structure 100. The removable liner 170 is used to conceal the adhesive component and prevent early sticking or bonding of the accent strip 105 to the base structure 100 during assembly. A leading portion 175 of the liner 170 may be removed from a small portion of the adhesive tape 165 during the mounting of the accent strip 105 to the base structure 100, as described below.

Figure 6:
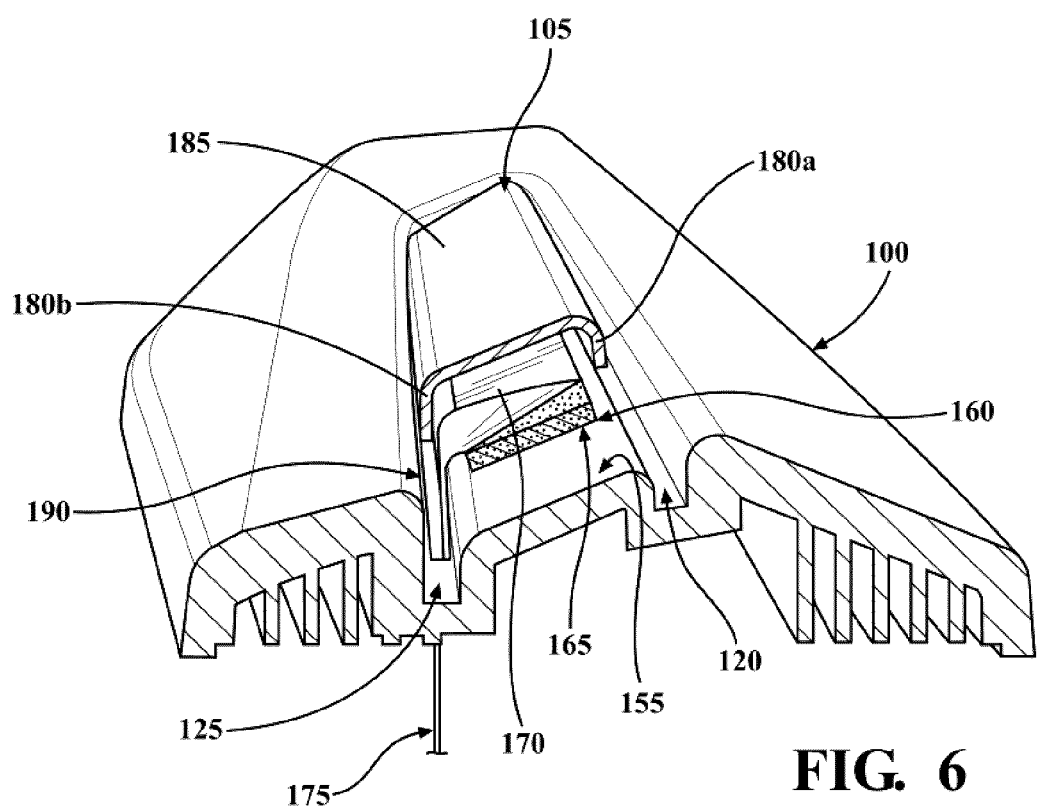
FIG. 6 is an enlarged perspective view of the accent molding and base structure during assembly.

As illustrated in FIGS. 4 and 6, the accent strip 105 has two opposing side walls, 180a, 180b which extend from a middle accent strip portion 185. Each side wall 180a, 180b may be the same height or each side wall 180a, 180b may have a different height depending on the desired geometry and appearance of the molding. As noted above, one side wall 180a is received within the top groove 120 and one side wall 180b is received within the bottom groove 125. In some embodiments, the side walls 180a, 180b extend at approximately right angles from the middle accent strip portion 185. The middle accent strip portion 185 is adhered to and supported by the middle portion 135 of the base structure 100.

Traditional mounting methods and base structures may result in the accent strip 105 being moved out of position resulting in aesthetic mis-alignment and/or damaging the base structure 100. The removable liner 170 of the adhesive tape 165 cannot be removed before the accent strip 105 is placed into position since adhesion of the accent strip 105 may occur prematurely. Due to the side walls 180a, 180b of the accent strip 105, and the grooves 120, 125 of the base structure 100, the removable liner 170 of the adhesive tape 165 cannot be removed from the top. The liner 170 also cannot be removed from the right or left side of this configuration (that is, from the first end 110 or the second end 115 of the base structure 100) without exhibiting tearing or stretching of the liner 170. To address these issues, the base structure 100 includes additional structural features for use when mounting the accent strip 105.

At least one slot 190 is defined by the base structure 100 in the top groove 120 or the bottom groove 125 to allow the liner 170 to be passed through the slot 190 as it is removed from the adhesive tape 165. In one embodiment, one slot 190 is defined in one of the top groove 120 or the bottom groove 125 adjacent each adhesive area 160. The slot 190 has a width greater than the thickness of the liner 170 and thus, the liner 170 may pass through the slot 190 as the liner 170 is removed from the adhesive tape 165. In some embodiments, the width of the slot 190 is greater than the thickness of the liner 170 but smaller than the width of the side wall 180b. The slots 190 allow the assembler to access and pull the sections of the liner 170 from the inward facing or back side of the base structure 100 rather than from the right or left side. The liner 170 thus can be safely peeled while exposing the acrylic adhesive portion of the tape 165.

Figure 5A:
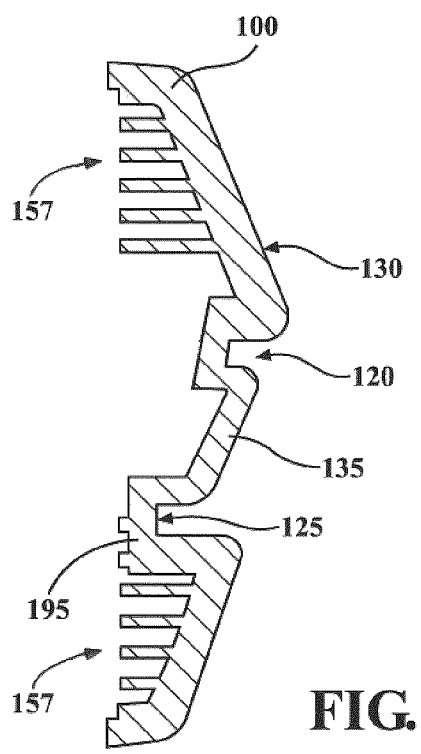
FIG. 5A is a cross-sectional view of FIG. 3 taken along line B-B.

The slots 190 may be defined in the top groove 120, the bottom groove 125, or combinations of the top and bottom grooves 120, 125. The location of the slots 190 may be based on the geometry of the base structure 100 and accent strip 105, and the desired direction for a vehicle production assembler to pull and remove the liner 170 from the adhesive tape 165. Each slot 190 may extend exactly the length of the adhesive region 160 and adhesive tape 165. In other embodiments, the slot 190 may extend slightly beyond one or both ends of the adhesive area 160 and adhesive tape 165 as shown in FIG. 3. In some embodiments, as illustrated in FIGS. 3, and 5A discrete slots 190 may be spaced along the base structure 100 within the bottom groove 125 and separated by bridge areas 195. The bridge areas 195 serve to maintain the thickness of the base structure 100 and connections between the middle portion 135 and outer portion 150 in order to maintain the structural rigidity and strength of the base structure 100. In other embodiments (not shown) each slot may extend along the length of multiple adhesive regions 160, or one long slot may be provided in the top groove 120 or bottom groove 125 to accommodate the removal of all of the sections of liner 170.

The middle portion 135 of the base structure 100 also defines at least one aperture 200 which may be used by the assembler when mounting the accent strip 105 to the base structure 100. In some embodiments, particularly if the middle portion 135 of the base structure 100 is recessed below the outward facing surface 130, not enough space is available for an assembler to hold and handle the accent strip 105 before it is secured to the base structure 100. The aperture 200 allows the assembler to hold and move the accent strip 105 along the length of the base structure 100 into the correct position between the first end 110 and the second end 115. The aperture 200 is sized to provide enough space for an assembler's hand, fingers, or tool to hold and move the accent strip 105. In one embodiment, the aperture 200 extends from the top groove 120 to the bottom groove 125. The aperture 200 also may be positioned adjacent one or more adhesive regions 160 to allow the assembler to best control the position of the accent strip 105. For example, as shown in FIG. 2, the aperture 200 is positioned in the centre of the middle portion 135 between the centre two adhesive regions 160.

Figure 7:
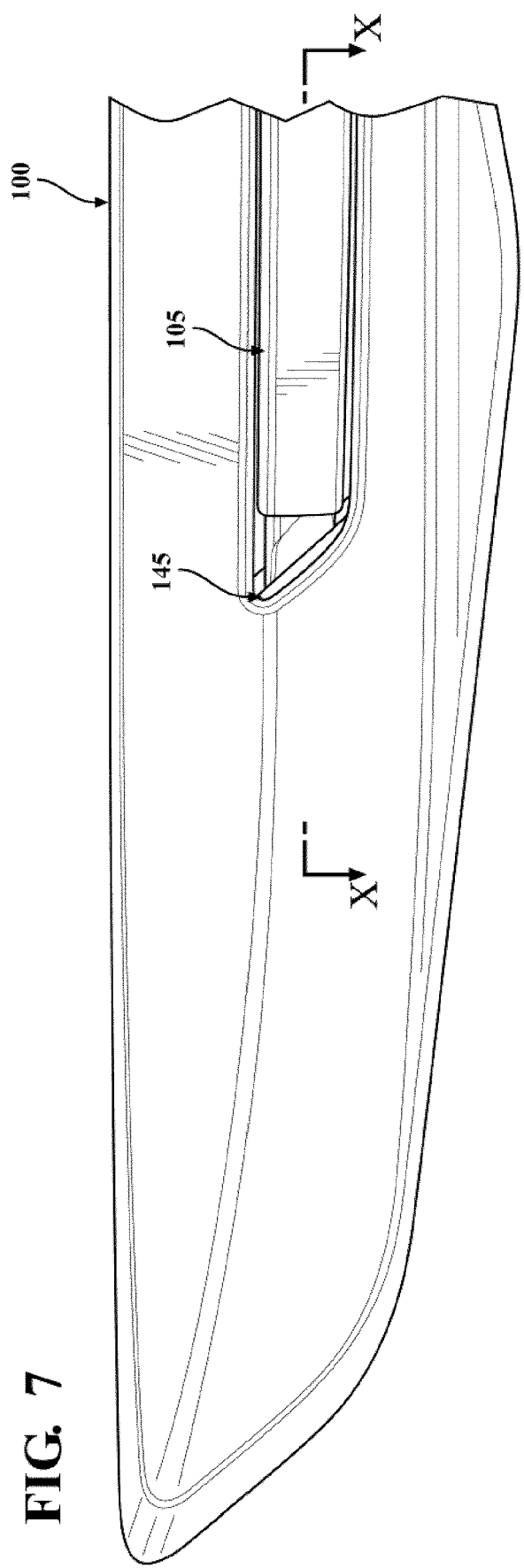
FIG. 7 is a front view of a portion of the accent strip and base structure during assembly.
Figure 8:
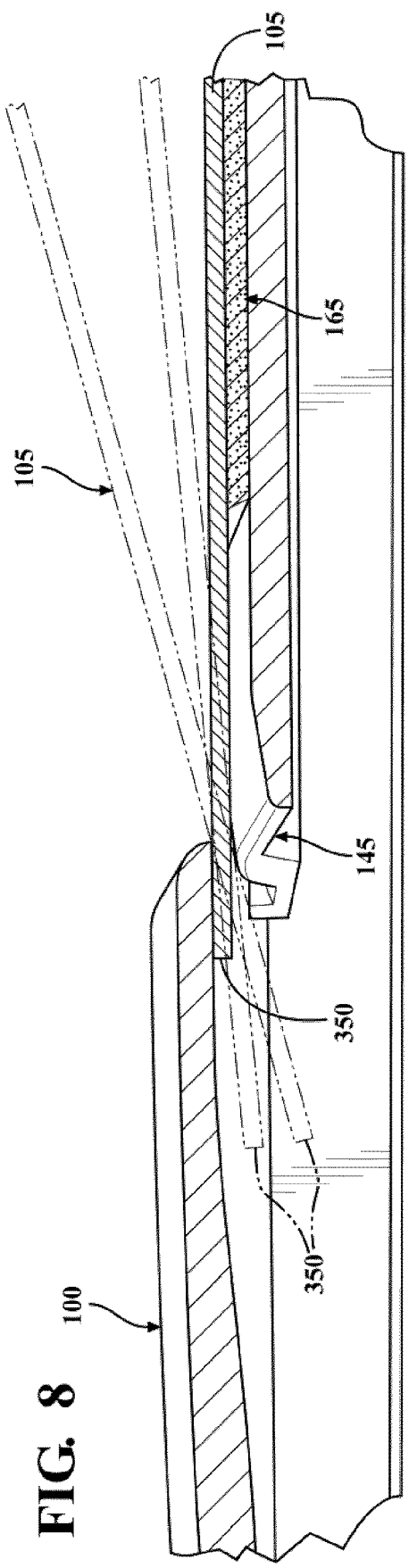
FIG. 8 is a cross-sectional view of FIG. 7 taken along line X-X.
Figure 9:
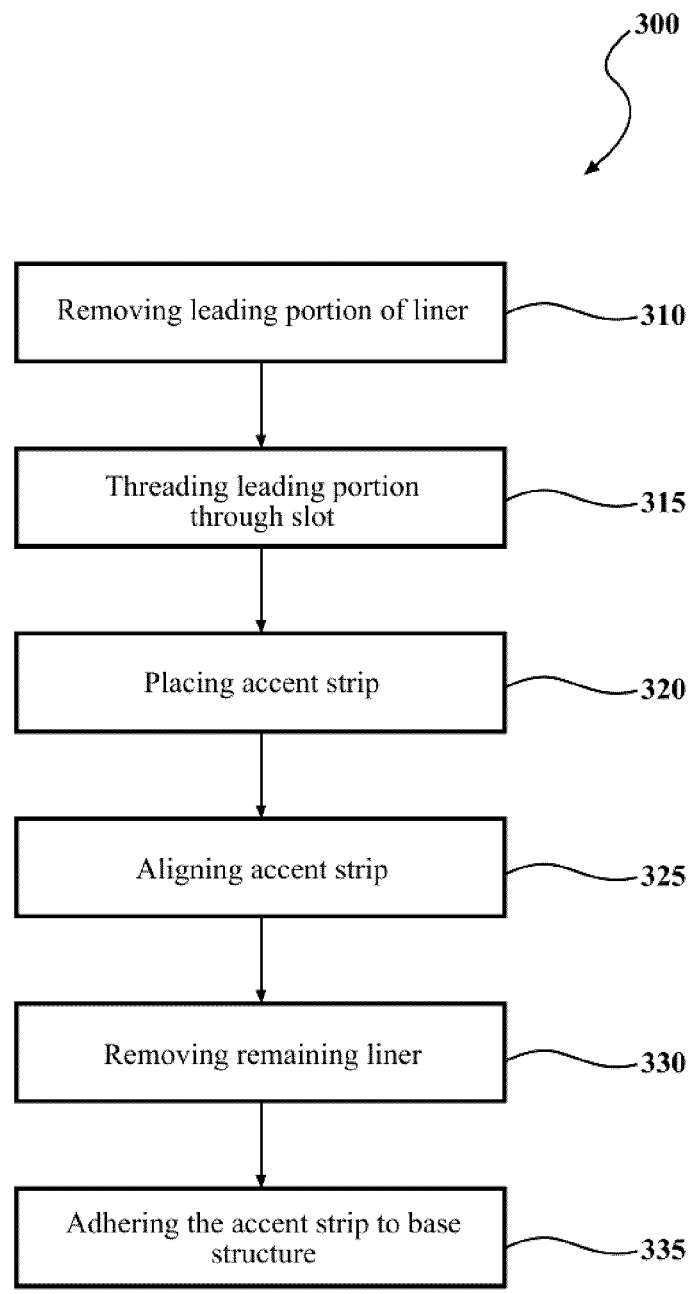
FIG. 9 is a flow chart of a method of mounting an accent strip and a base structure.

FIGS. 7 and 8 are close up and cross-sectional views, respectively, of the second end 115 of the base structure 100 and the second opening 145 during mounting of the accent strip 105. A method 300 of mounting the accent strip 105 to the base structure 100 is set out in the flowchart of FIG. 9. Specifically, to attach the accent strip 105 to the base structure 100, the method includes removing (action 310) a leading portion 175 of the liner 170 and threading (action 315) the leading portion 175 through the adjacent slot 190. These actions are repeated for each section of adhesive tape 165 and liner 170 which will be covered by the accent strip 105. As shown in FIGS. 2 and 3, just a small corner of the liner 170 may be folded at the corner edge of the adhesive tape 165. Since only a small portion of the adhesive tape 165 is exposed, the chances of early sticking or bonding of the accent strip 105 to the base structure 100 are greatly reduced. In some embodiments, the method 300 may include an assembler first measuring, cutting and applying sections of adhesive tape 165 and liner 170 to the adhesive regions 160 of the middle portion 135 of the base structure 100.

The method 300 includes placing (action 320) the accent strip 105 in the base structure 100. In some embodiments, placing the accent strip 105 involves setting the side walls 180a, 180b of the accent strip 105 into the corresponding top and bottom grooves 120, 125. The accent strip 105 may then be supported and moved by an assembler through the use of the aperture 200 in order to align (action 325) the accent strip 105 into its correct final position in the base structure 100. The base structure 100 may include marked positions on its back or inner surface (not shown) to assist with the correct alignment of the accent strip 105.

In other embodiments, the base structure 100 includes first and second openings 140, 145, as described above, to conceal the ends of the accent strip 105. This hides and conceals unwanted misalignments between the accent strip 105 and the base structure 100. Any cosmetic imperfections at the ends of the accent strip 105, particularly the sharps ends of a metal accent strip 105, are also concealed behind the base structure 100. As well, for a metal accent strip 105, with the ends tucked in and nested inside the base structure 100 through the first and second openings 140, 145, the natural spring back behaviour of a metal accent strip 105 is trapped, thus preventing unwanted gapping and separation of the adhesive tape 165 between the accent strip 105 and the base structure 100. For this embodiment, placing (action 320) the accent strip 105 in the base structure 100 includes inserting each end of the accent strip 105 into the first and second openings 140, 145 of the base structure 100. Specifically, with reference to FIG. 8, one end, such as a second end 350 of the accent strip 105 is inserted into the second opening 145. The accent strip 105 is allowed to rotate, as shown by dashed lines in FIG. 8, into the grooves 120, 125 until the accent strip 105 is in a proper position. As the accent strip 105 is being rotated, an assembler supports or holds the accent strip 105 through the aperture 200 and slides or moves the first end (not shown) of the accent strip 105 into the first opening 140 of the base structure. In other words, one end of the accent strip 105 may be over-inserted into one of the openings 140, 145, and then the accent strip 105 is rotated and moved into place through the use of the aperture 200 to conceal the opposite end of the accent strip 105 into the other opening of the base structure 100. The accent strip 105 is thus aligned (action 325) into the base structure 100. As illustrated in FIG. 8, the middle portion 135 of the base structure 100 may include a bevelled end to facilitate mounting of the accent strip 105.

Once the accent strip 105 is placed and aligned into the proper position in the base structure 100, the method 300 includes removing (action 330) the remaining portions of the liner 170 for each section of adhesive tape 165. This is achieved by an assembler pulling the leading portions 175 of the liner 170 and removing the remaining portions through the slots 190. The method 300 ends with the assembler adhering (action 335) the accent strip 105 to the base structure 100, such as by pressing on the middle portion 185 of the accent strip 105 to ensure that it adheres properly to the sections of adhesive tape 165.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described. The subject matter described herein and in the recited claims intends to cover and embrace all suitable changes in technology.

The invention claimed is:

1. An elongate base structure for receiving an accent strip for a vehicle molding, the elongate base structure comprising:
    an outward facing surface;
    top and bottom elongate grooves defined in the outward facing surface;
    a middle base portion between the top and bottom grooves, the middle base portion having a middle outward facing surface with at least one adhesive region for receiving an adhesive;
    at least one slot defined in one of the top groove or the bottom groove, the at least one slot being adjacent to and extending along the at least one adhesive region of the middle base portion; and
    an aperture defined by the middle base portion, between the top and bottom grooves.

2. The elongate base structure of claim 1 wherein the base structure further comprises:
    a first end;
    a second end;

a first opening defined by the base structure, the first opening terminating the top and bottom grooves adjacent the first end; and a second opening defined by the base structure, the second opening terminating the top and bottom grooves adjacent the second end.

3. The elongate base structure of claim 1 wherein the middle outward facing surface of the middle base portion is recessed below the outward facing surface of the base structure.

4. The elongate base structure of claim 1 where the aperture is adjacent one of the at least one adhesive regions.

5. The elongate base structure of claim 1 wherein the aperture extends from the top groove to the bottom groove.

6. The elongate base structure of claim 1 wherein the at least one slot extends beyond each end of the at least one adjacent adhesive region.

7. The elongate base structure of claim 1 comprising four adhesive regions and four slots spaced along the length of the base structure, and wherein the aperture is defined by the middle base portion between the middle two adhesive regions and slots.

8. The elongate base structure of claim 1 further comprising an adhesive tape fastened to the at least one adhesive region and the adhesive tape having a removable liner, wherein the width of the slot adjacent the at least one adhesive region is greater than the thickness of the removable liner.

9. The elongate base structure of claim 2 further comprising an adhesive tape fastened to the at least one adhesive region and the adhesive tape having a removable liner, wherein the width of the slot adjacent the at least one adhesive region is greater than the thickness of the removable liner.

10. The elongate base structure of claim 1 further comprising one or more ribs, bosses, flanges, or combinations thereof extending from an inward facing of the base structure.

11. A method of mounting an accent strip for a vehicle to an elongate base structure, the elongate base structure having an outward facing surface; top and bottom elongate grooves defined in the outward facing surface; a middle base portion between the top and bottom grooves, the middle base portion having a middle outward facing surface with at least one adhesive region for receiving an adhesive tape having a removable liner; at least one slot defined in one of the top groove or the bottom groove, the at least one slot being adjacent to and extending along the at least one adhesive region of the middle base portion; and the middle base portion defining an aperture adjacent one of the at least one adhesive regions, the method comprising:

removing a leading portion of the removable liner of the adhesive tape;

threading the leading portion of the removable liner through the slot;

placing the accent strip within the grooves of the elongate base structure;

aligning the accent strip within the elongate base structure using the aperture;

removing a remaining portion of the removable liner using the leading portion; and pressing the accent strip against the middle base portion to secure the accent strip to the elongate base structure.

12. The method of claim 11 wherein the elongate base structure further defines a first opening terminating the top and bottom grooves adjacent the first end, and a second opening terminating the top and bottom grooves adjacent the second end, and wherein placing the accent strip within the grooves of the elongate base structure comprises:

inserting a first end of the accent strip into the first opening of the base; and rotating and sliding the accent strip to insert a second end of the accent strip into the second opening.

13. In combination, an elongate base structure for receiving an accent strip for a vehicle molding, wherein:

the elongate base structure comprises:
an outward facing surface;
top and bottom elongate grooves defined in the outward facing surface;
a middle base portion between the top and bottom grooves, the middle base portion having a middle outward facing surface with at least one adhesive region for receiving an adhesive;
at least one slot defined in one of the top groove or the bottom groove, the at least one slot being adjacent to and extending along the at least one adhesive region of the middle base portion; and
an aperture defined by the middle base portion, between the top and bottom grooves; and wherein the accent strip comprises:
two opposing side walls nested within the respective top and bottom elongate grooves, and
a middle accent strip portion extending between the two side walls, the middle accent strip portion being mounted to the middle base portion with adhesive.

14. The combination of claim 13 wherein the elongate base structure further comprises:
a first end;
a second end;
a first opening defined by the base structure, the first opening terminating the top and bottom grooves adjacent the first end; and
a second opening defined by the base structure, the second opening terminating the top and bottom grooves adjacent the second end.

15. The combination of claim 14 wherein the accent strip further comprises a first end extending through the first opening defined by the base structure, a second end extending through the second opening defined by the base structure, and a middle accent strip portion extending between the two side walls, the middle accent strip portion being mounted to the middle base portion with adhesive.

16. The combination of claim 15 wherein the side wall of the accent strip which is nested within the bottom elongated groove has a width greater than the width of the slot.

17. The combination of claim 16 wherein the accent strip comprises metal or chrome plated plastic.

* * * * *